United States Patent [19]
Price

[11] 3,742,106
[45] June 26, 1973

[54] PRODUCTION OF IMPREGNATED ROVINGS
[75] Inventor: Roger Vernon Price, Lipson, England
[73] Assignee: Imperial Chemical Industries Limited, London, England
[22] Filed: Mar. 23, 1971
[21] Appl. No.: 127,302

[30] Foreign Application Priority Data
Apr. 7, 1970  Great Britain.................. 16,512/70

[52] U.S. Cl............ 264/131, 117/DIG. 6, 156/167, 264/DIG. 51, 264/134
[51] Int. Cl............................ B29b 1/00, B29f 5/00
[58] Field of Search...................... 264/131, DIG. 51, 264/134, 136; 156/167, 296; 117/DIG. 6

[56] References Cited
UNITED STATES PATENTS
2,981,631  4/1961  Nagel......................... 264/DIG. 51
2,888,501  3/1959  Bradt......................... 264/DIG. 53
2,989,777  6/1961  Bailey........................ 264/DIG. 51
3,450,810  6/1969  Lagarde............................ 264/137
3,530,212  9/1970  Kienle............................. 264/137
2,399,258  4/1946  Taylor...................... 264/DIG. 75
3,586,560  6/1971  Stranch............................ 156/167
3,673,027  6/1971  Spencer....................... 117/DIG. 6
3,703,396  11/1972 Lamanche.......................... 264/137

OTHER PUBLICATIONS
Checkel, R. L., Fluidized Polymer Deposition, Modern Plastics, Vol. 36, No. 2, (Oct. 1958) pp. 128 & 130

Primary Examiner—Robert F. White
Assistant Examiner—Richard R. Kucia
Attorney—Cushman, Darby & Cushman

[57] ABSTRACT
Spreading glass rovings out as they pass through a bed of a powdered thermoplastic and subsequently heating the roving so that the thermoplastic flows to produce a matrix around the fibres.

8 Claims, 6 Drawing Figures

PRODUCTION OF IMPREGNATED ROVINGS

The present invention relates to a process for the production of fibre reinforced synthetic thermoplastic materials and to moulding materials produced therefrom.

Reinforced thermoplastic materials are generally produced by compounding a reinforcing material and a thermoplastic material together on, for example, a two roll mill or in an extruder and then comminuting the crepe or extrudate thus obtained to produce granules which are subsequently moulded to form the desired articles. However, cheap reinforcing fibres particularly glass fibres are often supplied as continuous rovings consisting of several groups of filaments. It is difficult to produce satisfactory moulding granules from these rovings because theremoplastic material cannot be adequately distributed throughout the roving to ensure an acceptable dispersion of the glass in the subsequently moulded product without a long and severe moulding operation. The present invention is directed towards overcoming this disadvantage.

According to the present invention we provide a continuous process for the production of fibre reinforced thermoplastic material comprising passing a roving through a bed of powdered thermoplastic material and while the roving is in said bed separating the roving into bundles each consisting of one or more filaments and subsequently heating the roving impregnated with the powdered thermoplastic to above the melting point of the thermoplastic.

By the term "thermoplastic material" we mean a material which when heated to above its melting point will flow to form a homogeneous mass. The powdered thermoplastic material we prefer to use is a particulate material of weight average particle size less than 1,500 microns. We especially prefer to use material of between 100 and 500 microns weight average particle size, although it is often useful to include a small quantity of powder of average particle size well outside this range. Examples of suitable thermoplastics which may be used include polymers and copolymers of α-olefines, such as high and low density polyethylene, polypropylene, polybutene, poly-4-methyl pentene-1, propylene/ethylene copolymers, copolymers of 4-methyl pentene-1 with linear α-olefines containing four to 18 carbon atoms, and ethylene/vinyl acetate copolymers; polymers and copolymers of vinyl chloride, vinyl acetate, vinyl butyral, styrene, substituted styrenes such as α-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidene chloride, alkyl acrylates such as 2-ethyl hexyl acrylate, alkyl fumarates, alkyl vinyl ethers, such as cetyl vinyl ether, thermoplastic polyimide precursors; polyvinyl acetate; polyvinyl butyral; polystyrene; styrene/acrylonitrile copolymers; polyacrylonitrile; copolymers of butadiene with methyl methacrylate and/or styrene and optionally acrylonitrile; polymethyl methacrylate; copolymers of methyl methacrylate with minor amounts of alkyl acrylates such as methyl acrylate, ethyl acrylate and butyl acrylate; copolymers of methyl methacrylate, and vinylidene chloride/acrylonitrile copolymers; melt processable copolymers of tetrafluoroethylene and hexafluoropropylene.

Halogenated polymers or copolymers may be used; for example halogenated α-olefine polymers, such as chlorinated polyethylene, or halogenated vinyl chloride polymers such as chlorinated polyvinyl chloride.

Other thermoplastic polymers that may be used include condensation polymers such as the injection moulding grades of linear polyesters such as polyethylene terephthalate; polyamides such as polycaprolactam, polyhexamethylene adipamide and copolyamides such as copolymers of hexamethylene diamine adipate and hexamethylene diamine isophthalate, particularly those containing from 5 to 15 percent by weight of hexamethylene diamine isophthalate; polysulphones and copolysulphones; polyphenylene oxides; polycarbonates; thermoplastic polymers and copolymers of formaldehyde; thermoplastic linear polyurethanes; and the thermoplastic derivatives of cellulose such as cellulose acetate, cellulose nitrate and cellulose butyrate.

Where a copolymer is used, the amounts of the comonomers that are used in the various copolymers will depend, inter alia, on the particular application or applications envisaged.

Blends of these thermoplastic resins may also be used.

Additives such as stabilisers, lubricants, processing aids, plasticisers, dyes, pigments, impact modifiers and fillers may be incorporated into the thermoplastic used to achieve a desired appearance, property or combination of properties.

The fibrous reinforcing material may be rovings of mineral fibrous material such as glass fibres. A glass roving usually consists of a number of groups called 'ends' of continuous glass filaments. We prefer to use glass rovings which have been coated with a finish such as a silane which improves the bond between the glass and the thermoplastic. Additionally they may be coated with a size or suitable film former such as starch, polyvinyl alcohol or polyvinyl acetate to protect the fibres from abrasion. Other reinforcing materials that may be used include carbon fibres or thin metal wires.

The thermoplastic particulate material may also contain a coupling agent to improve the bond between the glass and the thermoplastic resin.

Any suitable means may be used to separate or "comb" the strands of the roving as it passes through the powdered thermoplastic. We prefer to use a short toothed comb through which the rovings are drawn or a series of threaded or ribbed rods or bars may be used and the roving conveniently drawn over and under successive rods or bars to separate the roving into bundles of filaments. The combs, rods or bars may be made of any suitable material such as metal, ceramic, plastic or wood; also, if rods or bars are employed they may be stationary about their axes or they may rotate about their axes.

The diameter of the glass roving while it is being hauled through the polymer bed is preferably within the range 0.5 to 4 mm although the diameter is arbitrary and will not necessarily be the same as that of the roving before being subjected to the process of the present invention. In fact the roving may exist as a tape before treatment.

It is particularly important in our process that the thermoplastic material should be in the form of a powder. This is because the powder has an abrasive effect on the glass rovings which pushes the individual fibres apart resulting in excellent impregnation of the glass roving by the polymer. It is, nevertheless, important to subject the rovings to a combing action in the presence of the powder so that they are initially separated so that the powder can penetrate the fibres to exert an abrasive effect. If there is no combing effect little polymer will be picked up. As mentioned hereinbefore it is often desirable to include a small quantity of a powder of particle size well outside that of the range of the bulk of the thermoplastic being treated as this may sometimes improve the abrasive properties of the thermoplastic material. The particles of the thermoplastic material may also have better abrasive properties if they are jagged and irregular rather than smoothly spherical. The importance of the abrasive effect of the powder is seen when, by way of comparison, the rovings are passed through a thermoplastic melt, emulsion or solution. In such cases, even though the roving is combed, the emerging roving effectively merely has a sheath of thermoplastic material around it and little separation and penetration of the roving occurs. The dispersion of the polymer in the roving using such methods is thus poor and the emerging roving of limited use as starting material for subsequent processing operations to produce reinforced articles. Furthermore, if it is desired to cut the roving after impregnation with the thermoplastic into granules, this is rendered more difficult if the strands of the roving have not been separated by the thermoplastic material. To overcome such granulation difficulties with imperfectly impregnated rovings such as are obtained by passing the roving through a molten thermoplastic or an emulsion or solution the roving must generally be heated once again. In addition, in the case of emulsions or solutions, it is necessary to drive off the solvent or carrier before subsequent treatment.

The powder may, if desired, be fluidised by the introduction of a gas stream into the polymer bed. This has the advantage that less force is required to pull the roving through the polymer and separating devices at a given haul-off speed than to pull a roving through an unfluidised bed at the same speed. This effect becomes more pronounced the higher the haul-off speed and the larger the diameter of the roving being treated. Any suitable gas may be employed to fluidise the polymer bed. Suitable gases include air, nitrogen, carbon dioxide, or inert gases such as helium or argon.

If desired the bundles of fibres in the roving may be initially spread out by subjecting them to a gas jet before they pass into the powder bed where they are further separated.

The roving is spread out as it passes through the powdered thermoplastic so that the powder penetrates within the fibre structure of the roving. It is, of course, to be understood that two or more rovings may be passed through the bed at the same time. The rovings may, for example, be situated side by side or one upon the other. The roving may be pulled through the bed at any suitable speed but we have found haul-off rates between 30 cm per minute (approximately 1 foot per minute) and 1,500 cm per minute (approximately 50 feet per minute) to the particularly convenient. After passage through the bed the impregnated roving is heated to a temperature above, and sometimes well above, the melting point of the thermoplastic so that the polymer flows to form a matrix in which the fibres of the roving are embedded. Conveniently the roving is heated by passage through a heated tube incorporating a forming die at the end where the roving emerges. The maximum polymer content (and hence minimum glass content) of the emerging impregnated roving may be controlled inter alia by adjusting the size of the die opening to match the weight per unit length of the roving being used. By such adjustment a wide range of glass contents for the same or different rovings may be achieved. It is sometimes preferable to water cool the die in order to achieve a better surface finish on the impregnated roving. The tube used may be of any suitable length but we have found a tube having a length within the range 90 cm to 370 cm (approximately 3 feet to 12 feet) particularly convenient to use. Alternatively the roving may be passed through a cross-head of an extruder which is heated to the required temperature which depends on the nature of the thermoplastic material. If desired a further coating of thermoplastic may be applied to the outside of the roving as it passes through the cross-head.

If desired, the pick up bath (i.e., the vessel which contains the bed of powdered thermoplastic material) and tube or extruder may be enclosed in an inert gas to prevent oxidation.

The impregnated roving obtained by the process of the present invention may be chopped and used as granules in conventional injection moulding operations and we have found that the present invention provides a particularly convenient method for producing these granules. In particular the impregnated roving may be chopped up at room temperature and in fact it is preferable in our process that the hot impregnated roving is cooled, for example, by passing it through a cooling bath such as a water bath before chopping up into granules. Alternatively, the impregnated roving or rovings may be fed to a heated profiled die to produce a fibre reinforced thermoplastic section.

The presence or absence of a static charge on the apparatus used or the thermoplastic powder particles has been found to have no significant effect on the amount of polymer picked up by the roving or on the extent of impregnation.

As hereinbefore stated, the thermoplastic material used in the process of our invention must be a powder. Furthermore it is preferable that it be a dry, free flowing powder because we have found that the higher the moisture content of the powder and hence the poorer its flow, the less polymer is picked up when the roving is passed through the powder. The presence of a small proportion of particles of markedly smaller particle size than the bulk of the thermoplastic powder will also assist the powder flow properties.

The process of the present invention has the added advantage that the machinery or apparatus used for the production of impregnated rovings is cheap and simple. Furthermore, the apparatus is not subjected to the wear and tear normally experienced when compounding polymers and glass fibres in, for example, a screw extruder.

The present invention is illustrated but in no way limited by reference to the accompanying diagrammatic drawings in which.

Figure 1:
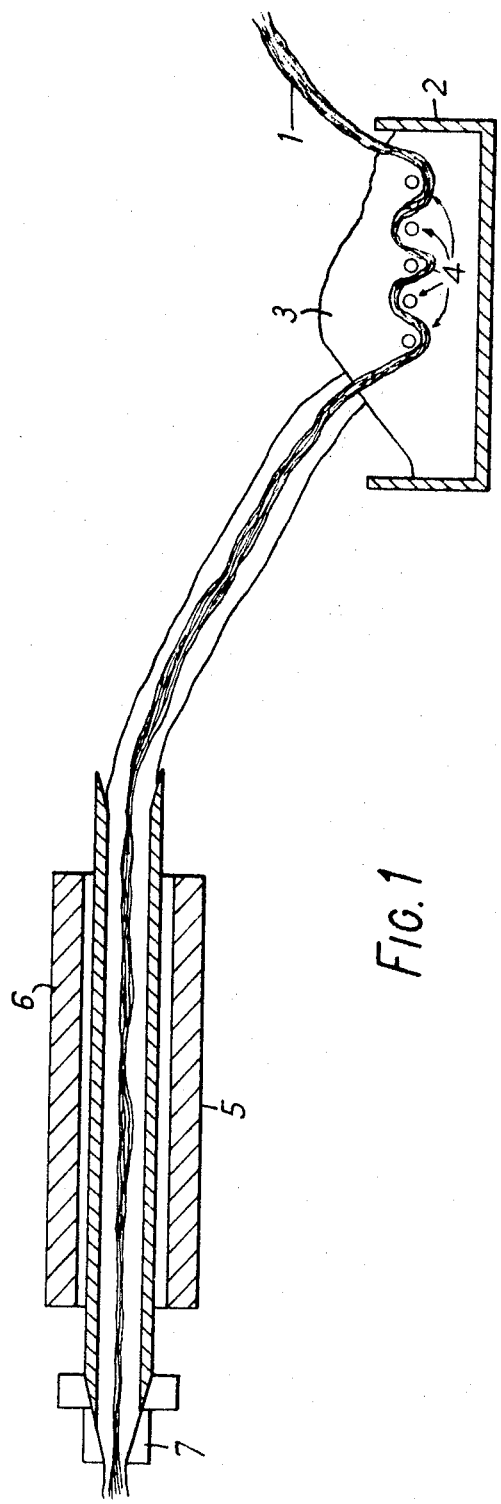
FIG. 1 illustrates schematically a working embodiment of our invention.

In FIG. 1 a continuous glass roving 1 is passing through a metal tray 2 which contains powdered thermoplastic material 3. Five threaded bars 4 of ¼ inch diameter extend transversely across the tray 2 and each bar is provided with a standard Whitworth thread of 20 threads per inch along its length. As is shown in the drawing the glass roving is threaded through the bars which are positioned beneath the powdered thermoplastic so that the roving is separated into bundles of filaments by the threads and the roving is impregnated with the powder. The impregnated roving passes through a tube 5 which is surrounded by a heating jacket 6 where the powdered thermoplastic material is heated to a temperature above its melting point so that it flows to form a matrix surrounding the strands of the roving. Finally the roving leaves the tube through the heated die 7.

In another embodiment of the invention, the apparatus shown in FIG. 1 is modified by connecting a source of nitrogen gas to the base of the tray 2 so that the roving is passed through a fluidised bed of the polymer 3.

The present invention is illustrated by the following examples in which impregnated rovings were produced using an apparatus of the type illustrated in FIG. 1, although this apparatus was modified in some way in most of the examples. In these examples, the rovings consisted of continuous glass filaments grouped into "ends," a certain number of which constitute a roving.

Examples 1 to 5 are intended to illustrate the advantage of passing the roving through a bed of powdery polymer as against a bed of molten polymer. The results obtained in these examples are summarised in Table 1.

EXAMPLE 1

A 21 end glass roving having 408 filaments per end, the filaments being coated with a silane finish and a polyvinyl acetate protective size, was drawn by a haul-off mechanism through an apparatus of the type shown in FIG. 1 but having minor modifications as will be exemplified below. The tray contained a commercially available powdered unpigmented polypropylene homopolymer of weight average particle size approximately 250 microns and which contained a coupling agent. The roving was separated into bundles of filaments of various sizes by passage round seven metal bars of ¼ inch diameter each formed with a standard Whitworth thread of 20 threads per inch. The heated tube was about 16 mm interior diameter and 90 cm long and was heated to 350°C at the entry end and to 300°C at the die end. The die was 3.8 mm internal diameter. After emergence from the die, the impregnated roving was cooled by passage through a water bath.

Using a haul-off speed of 150 cm per minute (approximately 5 feet per minute), the roving picked up polymer as it passed through the tray and then became consolidated as it passed through the tube and the die so that the bundles of glass fibres were well embedded in molten polymer. After cooling the lace was cut up to give granules containing 25 percent by weight of glass fibre which were found to be particularly suitable for injection moulding.

Figure 2:
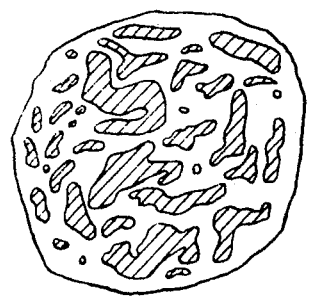
FIGS. 2 to 5 are reproductions of drawings of transverse cross sections of granules produced by the process of our invention.

The extent of the dispersion of the polymer within the glass roving was estimated by the following technique. Random granules were selected and transverse cross-sections of these having a thickness of approximately 1 mm were cut using a sharp razor blade. The samples were viewed under a microscope with magnification 56. The dispersion of the polymer was estimated by noting the range of the number of the separate glass bundles within the cross-sections from each granule. A number of drawings of the cross-sections were also made and a typical one is reproduced in FIG. 2.

The granules obtained were also used for the injection moulding of disc shaped mouldings. The machine used was a single screw injection moulding machine with a barrel of 8 ounces capacity. During injection the barrel was kept at a temperature rising over the length of the barrel from 220°C to 250°C (just before the nozzle) while the nozzle was kept at a temperature of 230°C. The effectiveness of the granules for injection moulding was estimated by measuring the minimum screw back time required to obtain a moulding of good and even appearance with no undispersed lumps of glass. The screw back time is the time taken, while feeding material into the hopper, for the screw ram to move back from the nozzle a sufficient distance for the barrel behind the nozzle to accommodate the charge of material to be injected. This may be varied by adjusting the back pressure on the screw. The longer is this screw back time, the more mechanical shear the material being processed receives. Thus granules having poor glass dispersion require a longer screw back to achieve a uniform moulding than granules having good glass dispersion. It is desirable to have as short a screw back time as possible for two reasons. Firstly the shorter the screw back time, the shorter and hence more economical is the moulding cycle. Secondly, the longer the screw back time, the greater is the shear and hence filament breakdown suffered by the fibres and since, other things being equal, the longer the average length of the filaments, the better will be the mechanical properties such as tensile strength of the moulded article, it is clearly advantageous that the screw back time should be as short as possible.

EXAMPLE 2

Figure 3:
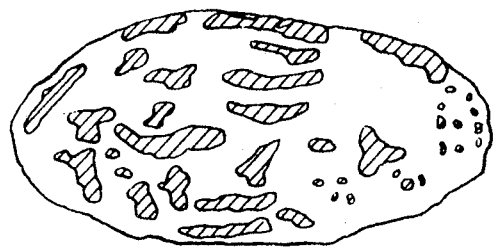

The experiment described in Example 1 was repeated except that the haul-off speed of the roving was decreased to 61 cm per minute (approximately 2 feet per minute). The dispersion of the polymer and the effectiveness of the granules for injection moulding were estimated and examined in the same way as in Example 1. A drawing of a typical cross-section of a granule is shown in FIG. 3.

EXAMPLE 3

Figure 4:
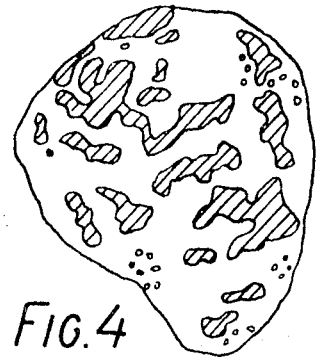

The experiment described in Example 1 was repeated except that the bed of polypropylene powder was fluidised by a stream of nitrogen entering at positions in the base of the tray as hereinbefore described and the number of bars was decreased to five. The dispersion of the polymer and the effectiveness of the granules for injection moulding was estimated and examined in the same way as in Examples 1 and 2. A drawing of a typical cross-section of a granule is reproduced in FIG. 4.

EXAMPLE 4

Figure 5:
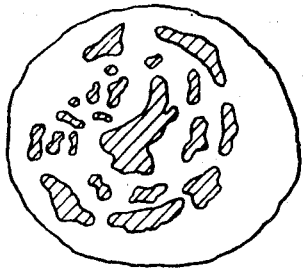

The experiment described in Example 3 was repeated except that the number of bars was reduced to three. The dispersion of the polymer and the effectiveness of the granules for injection moulding was estimated and examined as described in Examples 1 to 3. A drawing of a typical cross-section of such a granule is reproduced in FIG. 5.

EXAMPLE 5

Figure 6:
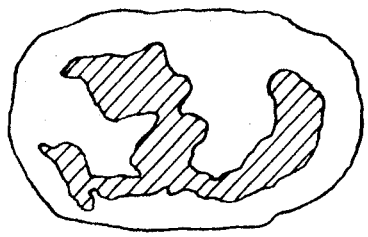
FIG. 6 is a reproduction of a drawing of a transverse cross section of a granule not produced by the process of our invention.

The experiment described in Example 1 was repeated except that the bed of powdered polypropylene was substituted by a bath of molten polypropylene kept at 250°C. The dispersion of polymer in the granules and the effectiveness of the granules for injection moulding was estimated and examined as described in Examples 1 to 4. A drawing of a typical cross-section of such a granule is reproduced in FIG. 6.

The data obtained in Examples 1 to 5 are now summarised in Table 1 below.

TABLE 1

| Reference Example Number | State of the Bed of Polymer | No. of bars | Haul-off Speed cm per min | Range of the number of glass bundles per cross-section of granule | Screw-back time during injection molding of granules seconds |
|---|---|---|---|---|---|
| 1 | Non-fluidised Powder | 7 | 150 | 35 to 40 | 25 |
| 2 | Non-fluidised Powder | 7 | 60 | 45 to 46 | 25 |
| 3 | Fluidised Powder | 5 | 150 | 30 to 40 | 25 |
| 4 | Fluidised Powder | 3 | 150 | 13 to 30 | 25 |
| 5 | Melt | 7 | 150 | 1 to 6 | 55 |

From the results shown in Table 1 it is clear that the dispersion of the polymer in the granules in the cases where a powdery polymer is used in the tray, whether fluidised or non-fluidised, is far superior to the polymer dispersion in granules produced when the tray contains a polymer melt.

This result is exemplified by the drawings reproduced in FIGS. 2 to 5. The cross-sections of the granules produced from a polymer powder contain many discrete glass bundles whereas the cross-section of the granule produced via a polymer melt indicates that the granule comprises little more than a sheath of polymer surrounding an almost unseparated glass roving.

The usefulness of the granules prepared according to our invention is even further confirmed by comparison of the screw back times occurring during the injection moulding of the granules prepared as described in Examples 1 to 5. Thus it is seen that granules prepared via the melt require a screw back time of more than twice that of the granules prepared according to our invention.

The experiments described in Examples 6 to 9 are intended to illustrate the effect of the haul-off speed and the number of bars employed on the amount of polymer that is incorporated into the glass roving as it passes through the bed of powdered polymer.

EXAMPLE 6

The materials and operating procedure used in Example 1 were adopted except that the haul-off speed used was 90 cm per minute (approximately 3 feet per minute) and the numbers of bars employed were, in separate sets of experiments three, five, seven, nine and 11. In each experiment, after the system had settled down and was in equilibrium 0.91 metre (1 yard) of the impregnated roving emerging from the bed of polymer was cut out and weighed. This was repeated four times for each bar system. The amount of polymer incorporated per gram of roving was thus determined for each bar system.

EXAMPLE 7

The materials and operating procedure used in Example 6 were adopted except that the haul-off speed for all the experiments was 300 cm per minute (approximately 10 feet per minute). The products were evaluated in the same manner as in Example 6.

EXAMPLE 8

The materials, operating procedure and evaluation procedure used in Example 6 were adopted except that the bed of polymer was fluidised as hereinbefore described.

EXAMPLE 9

The materials, operating procedure and evaluation procedure used in Example 7 were adopted except that the bed of polymer was fluidised as hereinbefore described.

The data obtained in the experiments described in Examples 6 to 9 are summarised in Table 2 below.

TABLE 2

| Ref. Ex. No. | State of the Bed of Polymer | Haul-off speed cm per minute | Number of bars | Weight of Polymer in grams incorporated per gram of roving Average of 4 runs | % Glass (by weight) |
|---|---|---|---|---|---|
| 6 | Non-fluidised | 90 | 3 | 1.2 | 45 |
| | | | 5 | 2.6 | 28 |
| | | | 7 | 3.0 | 25 |
| | | | 9 | 3.9 | 21 |
| | | | 11 | 4.0 | 20 |
| 7 | Non-fluidised | 300 | 3 | 1.4 | 42 |
| | | | 5 | 2.3 | 30 |
| | | | 7 | 3.6 | 22 |
| | | | 9 | 3.8 | 21 |
| | | | 11 | 4.0 | 20 |
| 8 | Fluidised | 90 | 3 | 1.5 | 40 |
| | | | 5 | 2.2 | 31 |
| | | | 7 | 2.4 | 30 |
| | | | 9 | 3.0 | 25 |
| | | | 11 | 3.9 | 21 |
| 9 | Fluidised | 300 | 3 | 0.7 | 60 |
| | | | 5 | 1.7 | 38 |
| | | | 7 | 2.1 | 32 |
| | | | 9 | 3.0 | 25 |
| | | | 11 | 3.8 | 21 |

From the results shown in Table 2 it is clear that increasing the number of bars increases the amount of polymer incorporated into the rovings. However, it is apparent that increasing the haul-off speed does not substantially effect the amount of polymer incorporated into the rovings except in the case of a fluidised bed having a small number of bars in which case increasing the haul-off rate decreases the amount of polymer incorporated.

Examples 10 and 11 are intended to illustrate the effect of moisture on the amount of polymer incorporated into a glass roving when it is passed through a bed of the polymer.

EXAMPLE 10

A slurry of the polypropylene powder used in Example 1 and water was prepared having a solids content of 56.5 percent by weight. The mixture was poured into a polypropylene tray containing nine bars. A glass roving of the type used in Example 1 was pulled through the tray at a haul-off speed of 90 cm per minute (approximately 3 feet per minute).

After the system had equilibriated, the amount of polymer being incorporated into each gram of the roving was estimated as described in Examples 6 to 9. This was found to be 1.1 gms of polymer per gram of roving, i.e., the impregnated roving contained 48 percent glass. Examination of the impregnated roving showed that there was, in fact, no penetration of the polymer into the roving and that the only polymer pick up was due to wet polymer sticking to the surface of the roving. Thus it is clear that excess moisture in the polymeric powder seriously limits the ability of the apparatus to impregnate the glass roving with powder.

EXAMPLE 11

The polypropylene powder used in Example 1 was tumble blended with 2 percent by weight of water and the resulting material used in a fluidised bed in the manner described in Example 3, the tray containing 13 bars and not five as in Example 3. It was found that at the start of the experiment, the material would not flow and no penetration of the polymer into the roving was observed so that the glass content was high. As the experiment proceeded, however, and as the polymer dried out, the weight of polymer picked up by the roving increased until after about 45 minutes, by which time the powder was flowing normally, the usual high penetration and pick up of the polymer was observed. The results obtained during this experiment are summarised in Table 3.

TABLE 3

| Time Elapsed from the beginning of Roving Haul-Off Minutes | % Glass in Impregnated Roving |
| --- | --- |
| 0 | — |
| 5 | 65 |
| 15 | 48 |
| 20 | 40 |
| 25 | 40 |
| 32 | 28 |
| 40 | 28 |
| 50 | 25 |

Thus it is clear from this experiment that it is very desirable that the polymer should not contain so much moisture as will prevent it from flowing freely.

Example 12 is intended to show that the excellent incorporation and penetration of polymer obtained using our invention is not due to the effect of electrostatic charges present in the system and is in fact independent of any such effect.

EXAMPLE 12

The materials, operating procedure and evaluation procedure adopted were as used in Example 6 except that in one series of experiments an earthed metal tray having metal bars was used and then, in a second series of experiments a polypropylene tray having electrically charged metal bars was used. The results of the experiments are summarised in Table 4 below.

TABLE 4

| Type of Tray | No. of Bars | % Glass in Impregnated Roving |
| --- | --- | --- |
| Earthed metal with metal bars | 5 | 28 |
|  | 7 | 23 |
|  | 9 | 25 |
| Polypropylene with charged metal bars | 5 | 27 |
|  | 7 | 25 |
|  | 9 | 25 |

It is thus clear that electrostatic charging of the apparatus is not a relevant factor in our invention.

Example 13 is intended to illustrate that although a fluidised bed is not advantageous over a non-fluidised bed from the viewpoint of the amount or quality of dispersion of the polymer incorporated, it nevertheless has the advantage that less effort is required to pull a roving through a fluidised bed under otherwise identical conditions.

EXAMPLE 13

A glas roving of the type used in Example 1 was pulled through a bed of non-fluidised polypropylene of the type used in Example 1. The tray employed had 11 bars of the type described in Example 1. Two pulling speeds were used; 90 cm per minute (approximately 3 feet per minute) and 340 cm per minute (approximately 11 feet per minute) respectively and the pull required for each speed was measured. The experiment was repeated for a fluidised bed of polymer. A control experiment with no polymer in the bed was also carried out.

The experiments described above were repeated except that a glass roving having 42 ends each comprised of 408 filaments replaced the roving having 21 ends.

The data from the experiments are summarised in Table 5 below.

TABLE 5

| Number of Ends in Glass Roving | State of Polymer Bed | Haul-off Speed cm. per min. | Pull required to haul roving through bed. Newtons |
| --- | --- | --- | --- |
| 21 | No Powder in Tray | 90 | 8.9 |
|  |  | 340 | 8.9 |
|  | Non Fluidised Bed | 90 | 22.2 |
|  |  | 340 | 31.1 |
|  | Fluidised Bed | 90 | 20.0 |
|  |  | 340 | 20.0 |
| 42 | No Powder in Tray | 90 | 35.6 |
|  |  | 340 | 35.6 |
|  | Non Fluidised Bed | 90 | 44.5 |
|  |  | 340 | 71.2 |
|  | Fluidised Bed | 90 | 35.6 |
|  |  | 340 | 40.0 |

It is seen from Table 5 that less force is required to pull a roving through a fluidised bed than a non-fluidised bed, although this advantage becomes more pronounced the higher the haul-off speed and the larger the diameter the roving being treated.

Examples 14 to 16 are intended to show that the process of our invention may be used for thermoplastics other than polypropylene. Example 16 illustrates that rovings other than glass rovings may be used.

EXAMPLE 14

The materials and operating procedure used in Example 1 were adopted except that the polypropylene powder was replaced by a commercially available grade of nylon 6:6 that had been ground down to a weight average particle size of 250 microns and the heated tube was maintained at 275°–280°C along its entire length. The resulting granules contained 27 percent by weight of glass and were found to be very suitable for injection moulding and extrusion. The dispersion of the polymer within the glass roving was found to be excellent.

EXAMPLE 15

The materials and operating procedure used in Example 1 were adopted except that the polypropylene powder was replaced by a commercial grade of granular poly(vinyl chloride) homopolymer having a Fikentscher K value of 60 and an average particle size of 150 microns and having incorporated into it a thio-tin stabiliser. Also the heated tube was maintained at 180°C along its length. The resulting granules contained 17 percent by weight of glass and were found to be very suitable for injection moulding and extrusion. The dispersion of the polymer within the glass roving was found to be excellent.

EXAMPLE 16

The operating procedure used in Example 1 was adopted. However, the glass roving was replaced by a continuous carbon filament tow made up of 10,000 individual filaments, each 7 to 8 microns in diameter. Further, the tray did not contain polypropylene but a commercially available grade of polysulphone which had been ground down to a powder having a weight average particle size of 250 microns. Also the heated tube was maintained at 350°C along its entire length.

The resulting granules contained 21 percent by weight of carbon filaments and were found to be very suitable for injection moulding and extrusion. The dispersion of the polysulphone within the carbon fibre tow was found to be excellent.

EXAMPLE 17

The materials and operating procedure used in Example 1 were used except that the polypropylene powder was first intimately blended with a red-brown pigment (ferric oxide) before placing in the tray. The pigment was found to be excellently dispersed in resulting granules showing that the process of our invention does not separate out to any great extent a pigment that has been incorporated into a thermoplastic powder.

I claim:

1. A continuous process for the production of fibre reinforced thermoplastic material comprising passing a roving through a bed of powdered thermoplastic material, while the roving is in said bed, drawing the roving over and under a succession of rods or bars so as to separate it into bundles of filaments of various sizes whereby the powder penetrates within the fibre structure of the roving so that an impregnated roving is produced, and subsequently heating the roving impregnated with the powdered thermoplastic to a temperature above the melting points of the thermoplastic and passing it through a die while the thermoplastic is molten so as to form a consolidated fibre reinforced thermoplastic product in which said bundles are embedded in the thermoplastic.

2. A process according to claim 1 wherein the thermoplastic material is a polymeric material selected from the group consisting of polypropylene, polyethylene, vinyl chloride polymers or copolymers, polyethylene terephthalate, acrylonitrile polymers or copolymers, polyamides or copolyamides, thermoplastic polymers of formaldehyde, polycarbonates, and polysulphones.

3. A process according to claim 1 wherein the roving is a glass roving.

4. A process according to claim 1 wherein the roving is a carbon filament roving.

5. A process according to claim 1 wherein the powdered thermoplastic material is fluidised while the roving is passing through it.

6. A process according to claim 1 wherein the roving impregnated with the powdered thermoplastic is heated by passing it through the cross-head of a heated extruder.

7. A process according to claim 1 wherein after the roving impregnated with the powdered thermoplastic has been heated to a temperature above the melting point of the thermoplastic and passed through a die it is chopped up into granules.

8. A process according to claim 1 wherein the pull used to haul the roving through the bed is less than 71.2 Newtons.

* * * * *